(12) United States Patent
Gnad

(10) Patent No.: US 9,833,946 B2
(45) Date of Patent: Dec. 5, 2017

(54) DEVICE FOR THE ULTRASONIC PROCESSING OF MATERIALS HAVING A TRIGGER APPARATUS

(71) Applicant: Herrmann Ultraschalltechnik GmbH & Co. KG, Karlsbad (DE)

(72) Inventor: Gerhard Gnad, Keltern (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 15/312,334

(22) PCT Filed: Jul. 20, 2015

(86) PCT No.: PCT/EP2015/066508
§ 371 (c)(1),
(2) Date: Nov. 18, 2016

(87) PCT Pub. No.: WO2016/016025
PCT Pub. Date: Feb. 4, 2016

(65) Prior Publication Data
US 2017/0087761 A1    Mar. 30, 2017

(30) Foreign Application Priority Data

Jul. 28, 2014 (DE) .................. 10 2014 110 634

(51) Int. Cl.
*B32B 37/00* (2006.01)
*B29C 65/08* (2006.01)
*B29C 65/00* (2006.01)

(52) U.S. Cl.
CPC .......... *B29C 65/085* (2013.01); *B29C 65/086* (2013.01); *B29C 65/087* (2013.01); *B29C 66/9221* (2013.01); *B06B 2201/72* (2013.01)

(58) Field of Classification Search
CPC ..... B29C 65/08; B29C 65/085; B29C 65/086; B29C 65/087; B29C 66/9221; B65B 51/225
USPC .................................. 156/73.1, 580.1, 580.2
See application file for complete search history.

(56) References Cited

U.S. PATENT DOCUMENTS

| 6,099,670 A | 8/2000 | Lounks et al. |
| 9,427,914 B2 | 8/2016 | Heeg |

(Continued)

FOREIGN PATENT DOCUMENTS

| DE | 699 02 928 T2 | 5/2003 |
| DE | 102 44 672 A1 | 4/2004 |

(Continued)

OTHER PUBLICATIONS

Nora Linder, International Bureau of the World Intellectual Property Organization, PCT/EP2015/066508, International Preliminary Report on Patentability, dated Feb. 2, 2017 (English translation).

*Primary Examiner* — James Sells
(74) *Attorney, Agent, or Firm* — Paul & Paul

(57) ABSTRACT

The present invention relates to a device for the ultrasonic processing of materials, which has an ultrasonic processing system, which comprises: an ultrasound generator, a converter (12), a sonotrode (16), and a counter tool (18); wherein the sonotrode (16) and/or the counter tool (18) has a substantially cylindrical sealing surface having at least one elevation (45) and can be rotated such that, during the processing, the elevation (45) rotates about the axis of rotation and comes in contact with the material web (20) during a sealing time, wherein a control apparatus (24) is provided for the ultrasound generator, to which control apparatus a feedback variable from the ultrasound processing system is fed and which control apparatus determines a manipulated variable therefrom and feeds said manipulated variable to the ultrasound generator, wherein a process (Continued)

Figure 1:
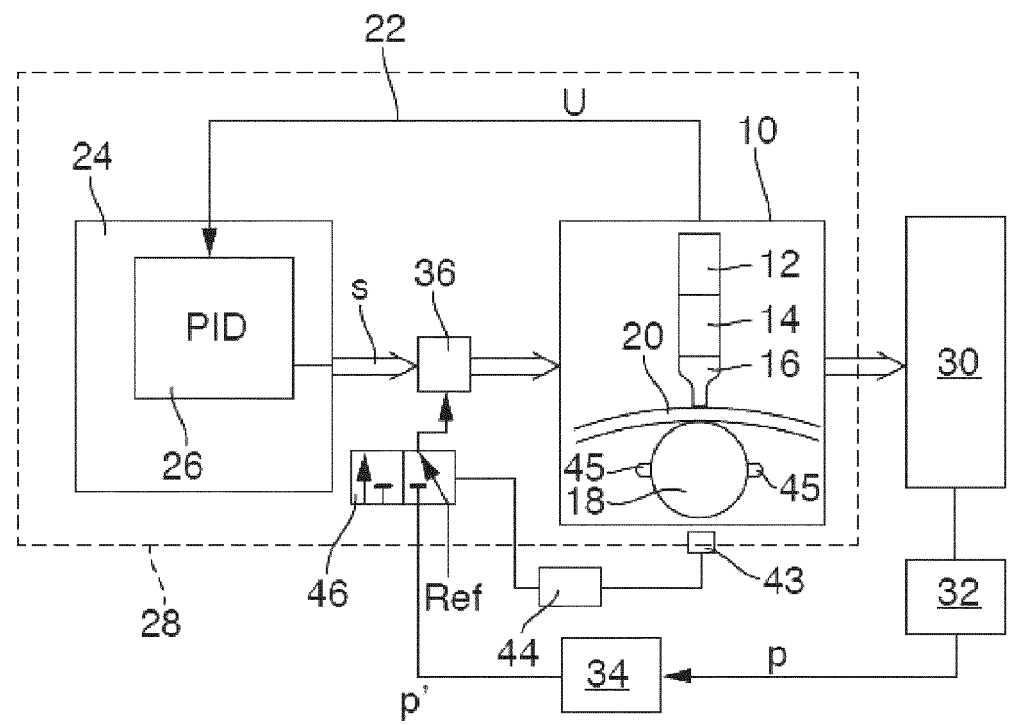

variable from the processing process is determined and is linked to the manipulated variable determined by the control apparatus (24) before the feeding to the ultrasound generator. In order to provide an improved device for the ultrasonic processing of materials having an ultrasonic processing system, a trigger apparatus (44) is provided, which determines the position of the elevation (45) and is designed to permit or prevent the linking of the process variable to the manipulated variable in accordance with the position determination.

20 Claims, 1 Drawing Sheet

(56) References Cited

U.S. PATENT DOCUMENTS

| | | |
|---|---|---|
| 2004/0226645 A1 | 11/2004 | Owen |
| 2005/0145317 A1 | 7/2005 | Yamamoto |
| 2007/0251977 A1 | 11/2007 | Gnad et al. |
| 2010/0243172 A1* | 9/2010 | Blanchard ............. B29C 65/086 156/504 |
| 2012/0168084 A1* | 7/2012 | Yamamoto ........ A61F 13/15739 156/379.8 |
| 2012/0175064 A1* | 7/2012 | Yamamoto ........ A61F 13/15739 156/379.6 |
| 2014/0033653 A1* | 2/2014 | Cham ................. B29C 65/7443 53/452 |
| 2015/0158247 A1 | 6/2015 | Heeg |

FOREIGN PATENT DOCUMENTS

| | | |
|---|---|---|
| DE | 10 2006 020 417 A1 | 11/2007 |
| EP | 1 609 582 A1 | 12/2005 |
| EP | 2 881 184 A1 | 6/2015 |
| JP | 2001354210 A | 12/2001 |
| JP | 2002059483 A | 2/2002 |

* cited by examiner

DEVICE FOR THE ULTRASONIC PROCESSING OF MATERIALS HAVING A TRIGGER APPARATUS

CROSS-REFERENCE TO RELATED APPLICATION

This application is a 371 national stage application of International Application PCT/EP2015/066508, filed Jul. 20, 2015, and claims the priority of German Application No. 10 2014 110 634.2, filed on Jul. 28, 2014.

The present invention concerns an apparatus for the ultrasonic processing of materials having an ultrasonic processing system which has an ultrasound generator, a converter, a sonotrode and a counterpart tool.

The ultrasound generator generates an electrical ac voltage which is converted by means of the converter into an acoustic ultrasonic vibration whose frequency is so matched to the sonotrode that the latter is put into a condition of resonance vibration. For processing the desired materials they are arranged between the sonotrode on the one hand and the counterpart tool on the other hand. The sonotrode which is excited with an ultrasonic vibration then presses the material against the counterpart tool and processes it.

Particularly when processing webs of material the sonotrode and/or the counterpart tool is equipped with a substantially cylindrical sealing surface and is rotated about the axis of the cylinder during the processing operation. In that case the peripheral speed of the cylindrical sealing surface is generally the same as the material feed speed.

Frequently the sealing surface has structures like for example a raised portion projecting above the sealing surface. When the material is being processed the structure of the sealing surface is transferred into the material.

Thus for example the raised portion can be elongate or rib-shaped and can extend in the axial direction on the sealing surface. It will be appreciated that other forms of raised portions like for example raised portions in point form or the in the form of a circle are also possible.

Hereinafter the invention is described by reference to the example of a raised portion on the counterpart tool. It will be understood however that instead of that or in addition the raised portion can be disposed on the sonotrode. It will be appreciated that it is also possible to provide a plurality of raised portions.

During the processing operation a sealing action occurs whenever the vibrating sonotrode exerts a force on the raised portion by way of the material.

For example, when using elongate raised portions extending transversely relative to a material web, in the described manner, it is possible to produce transverse sealing seams in material webs. Whenever the elongate raised portion on the counterpart tool is disposed opposite the sonotrode a transverse sealing seam is produced.

The use of raised portions however also has the result that the force exerted by the sonotrode on the counterpart tool by way of the material increases abruptly whenever, when the counterpart tool is rotating, a raised portion is positioned opposite the sonotrode. As a result, that involves the vibrating system being coupled to the counterpart tool. The vibration of the sonotrode is damped thereby and the natural frequency of the sonotrode is altered.

Consequently, in order to produce for example a vibration amplitude which is as constant as possible, the sonotrode either has to be excited at a different frequency or with a greater power level.

In general therefore the generator is subjected to closed-loop control, that is to say given system parameters of the electrical and mechanical vibration system are determined and, if they change, adaptation of frequency and/or voltage and/or current strength of the generator provides for the arrangement being regulated to the desired value again.

In that respect the attempt is generally made to keep the vibration amplitude as constant as possible and in so doing to consume as little energy as possible.

The closed-loop control is capable of reacting to gradual changes in the system, for example temperature changes and the change in length of the sonotrode that is linked thereto, in highly reliable fashion.

However the closed-loop control is subjected to limits in particular when abrupt changes are involved. In particular in the case of load changes, that is to say whenever the raised portion comes into processing engagement with the material, the system parameter changes abruptly and the closed-loop control has to intervene.

It has been found however that the closed-loop control does not react sufficiently quickly. Particularly when higher processing speeds are involved the raised portion comes into contact with the material only for a very short time so that not infrequently the closed-loop control reacts to the short-term increase in load only when the raised portion has already come out of engagement again. Keeping the vibration amplitude constant is here possible only with difficulty. All load changes of less than 5 ms therefore lead to considerable fluctuations in the vibration amplitude.

It has therefore already been proposed in DE 10 2006 020 417 that a process variable be ascertained from the processing process and the process variable ascertained in that way be linked to the adjusting variable of the control system.

For example the process variable can be the force of the sonotrode on the material, which is generally proportional to the processing force of the sonotrode. If during operation it is established that the deflection or the processing force of the sonotrode increases, which will be the case in particular when the raised portion comes into processing engagement, then the change is added possibly after suitable scaling to the adjusting variable. In that way the disturbance in the vibration amplitude by virtue of load changes can be markedly reduced. In practice a force sensor is installed in the transmission path between an adjusting device of the ultrasound vibration unit and the sonotrode. That force sensor is used to then measure the force which is generally the same as the force that the sonotrode exerts on the material web.

It will be noted however that fluctuations in the vibration amplitude nonetheless occur. In particular after the raised portion has come out of engagement again post-vibrations frequently occur. That is substantially due to the fact that, due to the abrupt increase in load, the holding arrangement of the sonotrode is elastically deformed and, in the following abrupt reduction in load, the sonotrode performs a damped vibration about the rest position.

The result of that damped vibration however is that the force measured at the force sensor also oscillates and therefore the process variable oscillates and intervenes in the closed-loop control process even when the raised portion is already no longer in contact with the material. The control process is seriously distorted as a result so that some time is required until the sonotrode is again at a constant vibration amplitude.

With the apparatus described in DE 10 2006 020 417 B4 it is possible to process material web speeds of 80 m/min with adequate quality. Nowadays however markedly higher processing speeds of for example 200-300 m/min are desired.

As a constant vibration amplitude must be attained at the latest when the next raised portion comes into engagement with the material the closed-loop control system described in DE 10 2006 020 417 is no longer adequate due to the increase in processing speed.

EP 1609582 A1, JP 200259483 and JP 2001354210 show various apparatuses for processing materials.

The object of the invention is therefore that of providing an apparatus of the kind set forth in the opening part of this specification, which permits faster closed-loop control of the ultrasound generator, in particular upon abrupt load changes.

According to the invention that object is attained in that there is provided a trigger device which determines the position of the raised portion and is adapted to permit or prevent linking of the process variable to the adjusting variable in dependence on the position determination.

In other words, when the raised portion is on the side of the counterpart tool, that faces away from the material, the linking of the process variable to the adjusting variable could be disabled so that any change in the process variable then no longer has any distorting influence on the adjusting variable and the closed-loop control functions effectively.

Preferably the trigger device is so adapted that it permits linking of the process variable to the adjusting variable when the raised portion comes into contact with the material to be processed and prevents same when the raised portion does not come into contact with the material to be processed.

In other words the linking measure described in DE 10 2006 020 417 B4 is brought into action immediately before the raised portion welds the material and is disabled again immediately after the welding operation is concluded.

According to the invention therefore that linking of process variable and adjusting variable is implemented in dependence on the position of the raised portion so that, when no abrupt change in load is to be expected because the raised portion is not in the proximity of the material to be processed, the linking is not used.

In a preferred embodiment however, in order not to negatively influence the closed-loop control, the trigger device is so adapted that while linking of the process variable to the adjusting variable is prevented, then instead a predetermined reference value is linked to the adjusting variable. The predetermined reference value does not have to be constant but can depend on time or the position of the raised portion.

In a preferred embodiment it is provided that the predetermined reference value is established as that value of the process variable, that had been detected immediately before the trigger device allows linking. That measure is based on the consideration that, immediately before an abrupt change in load is to be expected, the process variable value like for example the detected sealing force is of an almost constant value. That value is then fed to the linking in place of the measured force value when the linking to the process variable is prevented.

In a preferred embodiment the trigger device has a sensor for determining the position of the raised portion. That can be effected for example inductively. In principle however the drive of the counterpart tool and/or the sonotrode could be such that they make it possible to determine the position of the raised portion.

Figure 2:
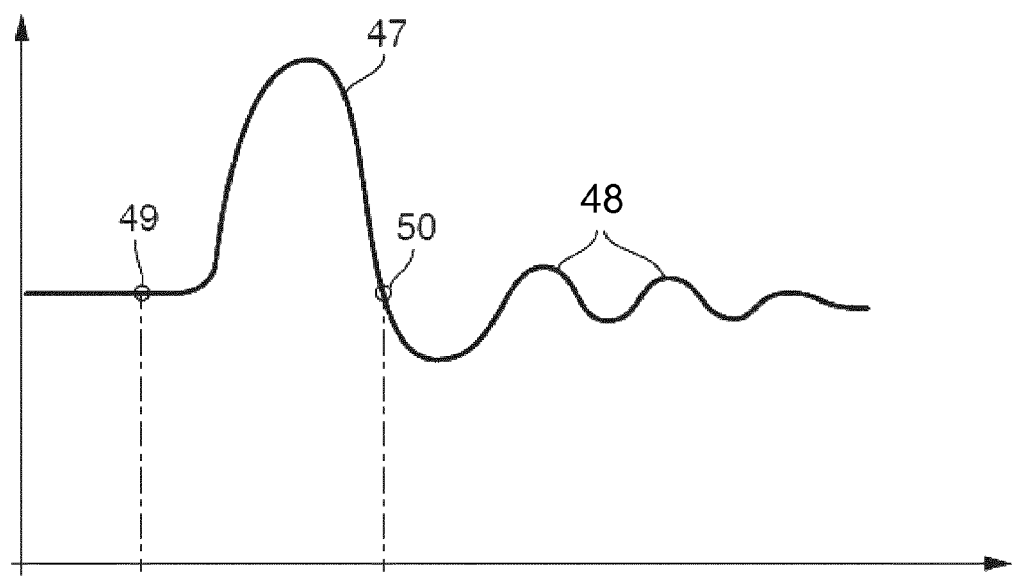

Further advantages, features and possible uses of the present invention will be clearly apparent from the description hereinafter of a preferred embodiment of the accompanying Figures in which:

FIG. 1 shows a diagrammatic view of an apparatus according to the invention, and FIG. 2 shows a graph representing force measurement at the sonotrode in relation to time.

FIG. 1 shows a circuit diagram of a ultrasound processing apparatus according to the invention. It has a vibration system 10 which includes a converter 12, an amplitude transformer 14, an ultrasound sonotrode 16 and a counterpart tool 18. The material 20 to be processed, like for example a material web, is arranged between the sonotrode 16 and the counterpart tool 18. The converter 12 is supplied with an ac voltage by means of an ultrasound generator (not shown).

Signals (u) are taken from the vibration system 10 and fed to a closed-loop control device 24 by way of a feedback path 22. That closed-loop control device 24 has a PID controller 26. The control device 24 produces an adjusting variable (s) which is fed to the vibration system 10 and in particular the converter 12. The vibration system 10 with the control device 24 forms a closed-loop control, electrical and mechanical vibration circuit 28. The control device 24 can be integrated in the ultrasound generator.

Reference 30 denotes a processing process, in particular a welding process, which is outside the vibration circuit 28 as it is not directly influenced by the electrical and mechanical variables. That processing process 30 is connected to a force sensor 32 with which the variation in the welding force is ascertained. The force sensor 32 ascertains a process variable (p) which is fed to a scaling unit 34. That scaling unit 34 delivers a scaled process variable (p') which is fed to a linking location 36. That linking location 36 is disposed between the control device 24 and the vibration system 10 so that not only the scaled process variable (p') but also the adjusting variable (s) is fed to the linking location 36. The interlinked variables (p') and (s) are fed to the vibration system 10 and in particular the ultrasound generator 12.

It will be seen that the sealing surface of the roller-shaped counterpart tool 18 has two oppositely disposed raised portions 45. These can be for example elongate ribs arranged in the axial direction. When processing the material web 20 the counterpart tool 18 is rotated about its axis so that the two raised portions 45 come into contact with the material web 20 in succession and provide for producing a transverse sealing seam when the material web is clamped between the sonotrode 16 and the raised portion 45.

Whenever one of the two projections 45 is pressed against the sonotrode 16 by way of the material web 20 that will have the result that an abrupt change in force is measured by way of the force sensor 32. If however the welding force is increased the sonotrode must provide a corresponding counteracting force, that is to say there is a slight elastic deformation of the sonotrode holder. As soon as the raised portion 45 is no longer pressed against the sonotrode 16 the sonotrode will move back into its original position again.

By virtue of the elastic properties of the sonotrode holder however that will result in an overshoot so that the variation in time of the welding force is in the form of a damped oscillation. As the welding force however is continuously measured by way of the sensor 32 the state of the art provides that the altered welding force is also fed uninterruptedly by way of the linking location 36 so that, even when the raised portion 45 is not in contact with the material web 20, the damped oscillation is fed as a scaled process variable p' to the linking location 36 and influences the closed-loop control. According to the invention therefore there is provided a trigger device 44 which, by means of a position sensor 43, determines the position of the raised portion 45 and actuates the switch 46 in dependence on the determining operation so that the linking location 36 is connected either to the scaled process variable p' or to a constant reference value ref.

In this embodiment the linking location 36 is connected to the constant reference value ref whenever the raised portions 45 no longer exert any force on the sonotrode 16. Any changes in the welding force which is effected without any influence by the raised portions 45 do not occur abruptly and can be regulated out by means of the control device 24. In that respect the reference value is so established that it corresponds to the scaled process variable p' which was measured immediately before linking to the process value takes place.

FIG. 2 shows a typical force measurement in relation to time.

A very substantially constant value in respect of the measured force will first be seen, wherein when the raised portion 45 encounters the sonotrode 16 by way of the material web 20 a force peak 47 is produced, which is caused by the additional load and the simultaneous damping of the vibration system. However the raised portion 45 comes out of engagement approximately at the point 50. It is possible clearly to see smaller peaks 48 which characterize post-vibration of the system.

In the embodiment which is described in DE 10 2006 020 417 that force signal is scaled and linked to the adjusting variable. That is advantageous in the region in which the raised portion is actually in engagement with the material web. If however the raised portion is not in engagement with the material web then the post-vibration peaks 48 have an adverse effect on closed-loop control by way of the linking.

According to the invention therefore linking of a possibly scaled process variable p' to the adjusting variable is effected in dependence on measurement of the position of the raised portion only in the region between the times 49 and 50, while after the time 50 the scaled process variable is replaced by a constant reference value. That constant reference value corresponds to the force value measured at the time 49.

LIST OF REFERENCES 10 vibration system
12 converter
14 amplitude transformer
16 ultrasound sonotrode
18 counterpart tool
20 material
22 feedback path
24 closed-loop control device
26 PID controller
28 vibration circuit
30 processing process
32 force sensor
34 scaling unit
36 linking location
43 position sensor
44 trigger device
45 raised portion
46 switch
47 force peak
48 post-vibration peak
49 time
50 time

The invention claimed is:

1. Apparatus for the ultrasonic processing of materials having an ultrasound processing system comprising an ultrasound generator, a converter (12), a sonotrode (16) and a counterpart tool (18), wherein the sonotrode (16) and/or the counterpart tool (18) has a substantially cylindrical sealing surface having at least one raised portion (45) and is rotatable so that the raised portion rotates about the axis of rotation during the processing operation and during a sealing time comes into contact with the material web (20), wherein there is provided a closed-loop control device (24) for the ultrasound generator to which a feedback variable is fed from the ultrasound processing system and which ascertains therefrom an adjusting variable and feeds it to the ultrasound generator, wherein a process variable is ascertained from the processing process and is linked to the adjusting variable ascertained by the closed-loop control device (24) prior to the feed to the ultrasound generator, characterised in that there is provided a trigger device (44) which determines the position of the raised portion (45) and is adapted to permit or prevent linking of the process variable to the adjusting variable in dependence on the position determination.

2. Apparatus as set forth in claim 1 characterised in that the trigger device is so adapted that it permits linking of the process variable to the adjusting variable when the raised portion (45) comes into contact with the material (20) to be processed and prevents same when the raised portion (45) does not come into contact with the material (20) to be processed.

3. Apparatus as set forth in claim 1 characterised in that the trigger device (44) is so adapted that while linking of the process variable to the adjusting variable is prevented instead a predetermined reference value is linked to the adjusting variable.

4. Apparatus as set forth in claim 3 characterised in that the predetermined reference value is established as that value of the process variable, that had been detected immediately before the trigger device (44) allows linking.

5. Apparatus as set forth in claim 1 characterised in that the trigger device (44) has a sensor (43) for determining the position of the raised portion.

6. Apparatus as set forth in claim 1 characterised in that the process variable is the processing force of the sonotrode (16).

7. Apparatus as set forth in claim 1 characterised in that the raised portion (45) is of a substantially elongate shape which is oriented axially on the sealing surface.

8. Apparatus as set forth in claim 2 characterised in that the trigger device (44) is so adapted that while linking of the process variable to the adjusting variable is prevented instead a predetermined reference value is linked to the adjusting variable.

9. Apparatus as set forth in claim 2 characterised in that the trigger device (44) has a sensor (43) for determining the position of the raised portion.

10. Apparatus as set forth in claim 3 characterised in that the trigger device (44) has a sensor (43) for determining the position of the raised portion.

11. Apparatus as set forth in claim 4 characterised in that the trigger device (44) has a sensor (43) for determining the position of the raised portion.

12. Apparatus as set forth in claim 2 characterised in that the process variable is the processing force of the sonotrode (16).

13. Apparatus as set forth in claim 3 characterised in that the process variable is the processing force of the sonotrode (16).

14. Apparatus as set forth in claim 4 characterised in that the process variable is the processing force of the sonotrode (16).

15. Apparatus as set forth in claim 5 characterised in that the process variable is the processing force of the sonotrode (16).

16. Apparatus as set forth in claim 2 characterised in that the raised portion (45) is of a substantially elongate shape which is oriented axially on the sealing surface.

17. Apparatus as set forth in claim 3 characterised in that the raised portion (45) is of a substantially elongate shape which is oriented axially on the sealing surface.

18. Apparatus as set forth in claim 4 characterised in that the raised portion (45) is of a substantially elongate shape which is oriented axially on the sealing surface.

19. Apparatus as set forth in claim 5 characterised in that the raised portion (45) is of a substantially elongate shape which is oriented axially on the sealing surface.

20. Apparatus as set forth in claim 6 characterised in that the raised portion (45) is of a substantially elongate shape which is oriented axially on the sealing surface.

* * * * *